United States Patent [19]

Sherwood et al.

[11] 4,445,165

[45] Apr. 24, 1984

[54] MOUNTING MEANS FOR HEADLIGHT-PROTECTIVE SCREENS

[76] Inventors: Bert J. Sherwood, 510 Warner Ave., Los Angeles, Calif. 90024; Fenton A. Liffick, 12449 Carol Pl., Granada Hills, Calif. 91344

[21] Appl. No.: 347,939

[22] Filed: Feb. 11, 1982

[51] Int. Cl.³ ............................................. F21V 15/00
[52] U.S. Cl. ................ 362/376; 292/307 R; 362/82; 362/267; 362/390; 362/457
[58] Field of Search ............... 292/307 R; 36/82, 267, 36/376, 457, 390

[56] References Cited

U.S. PATENT DOCUMENTS

| | | | |
|---|---|---|---|
| 2,813,970 | 11/1957 | Lester | 362/267 |
| 4,128,865 | 12/1978 | Johnson | 362/306 |
| 4,212,051 | 7/1980 | Kulik | 362/306 |

*Primary Examiner*—Stephen J. Lechert, Jr.
*Attorney, Agent, or Firm*—I. Morley Drucker

[57] ABSTRACT

A unitary grommet, adapted to securely mount therein a headlight-protecting screens and further adapted to enable secure mounting thereof in a headlight-opening-defining portion of a vehicle bumper or the like, for protecting the vehicle headlight, is described.

The unitary grommet is comprised of flexibly-resilient material, and includes a common wall, separating a peripheral screen-mounting section. The screen-mounting section extends behind the vehicle bumper headlight-opening, for preventing access thereto, and to enable secure and efficient mounting of the screen in the grommet. The bumper-mounting section is adapted to extend peripherally about the bumper headlight opening, when the grommet is properly mounted, and provides a molded channel for securely mounting the grommet in the vehicle bumper headlight opening.

8 Claims, 3 Drawing Figures

U.S. Patent
Apr. 24, 1984
4,445,165
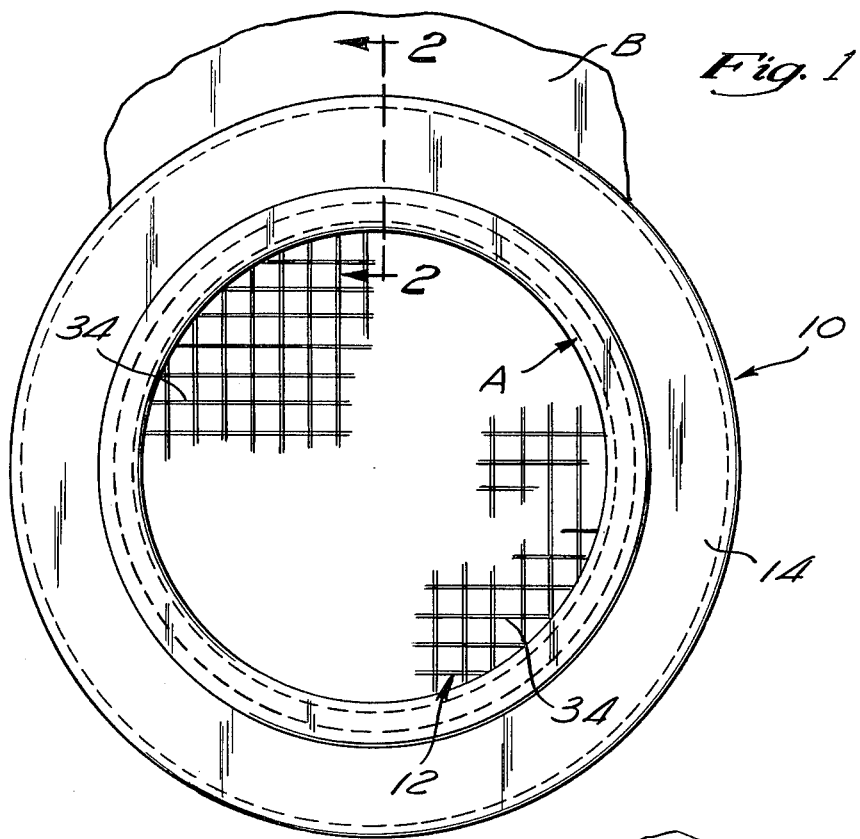
Fig. 1
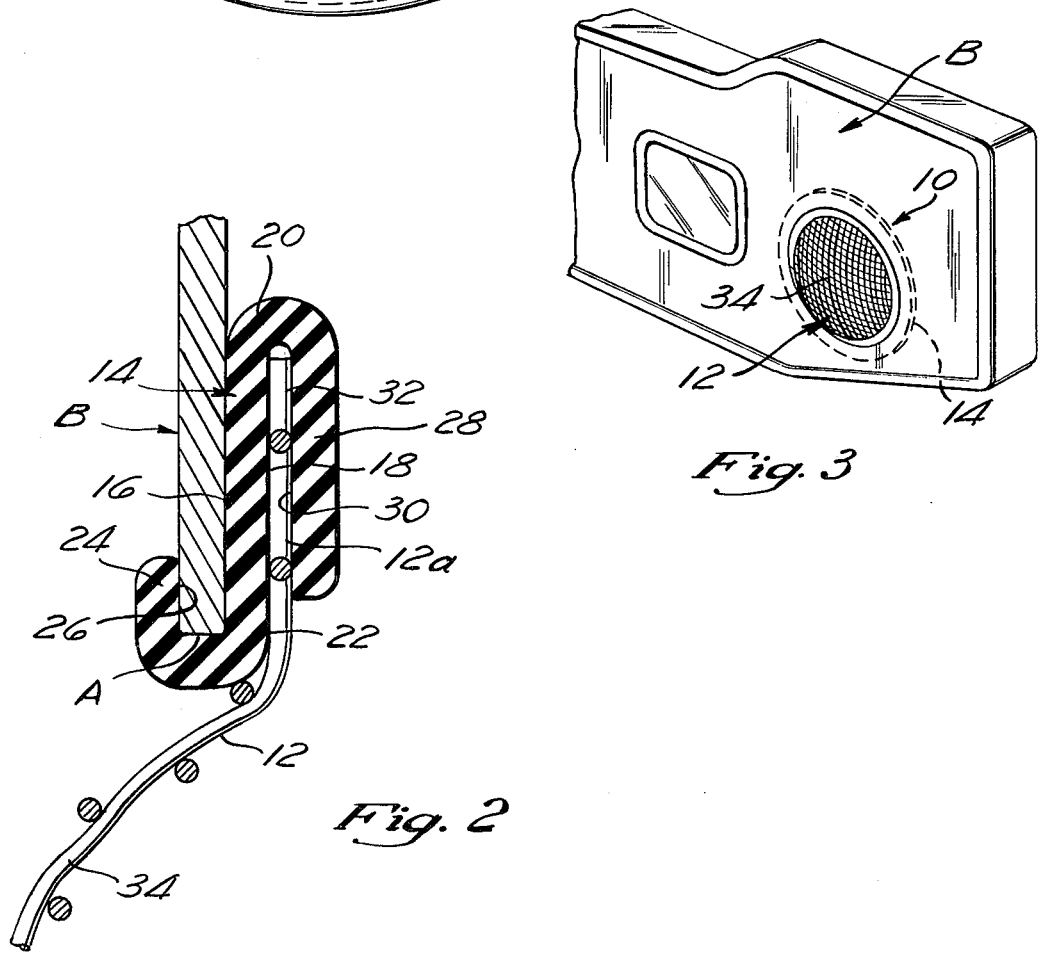
Fig. 2
Fig. 3

MOUNTING MEANS FOR HEADLIGHT-PROTECTIVE SCREENS

BACKGROUND OF THE INVENTION

1. Field of the Invention

The present invention relates generally to articles for mounting protective devices in vehicles, and relates specifically to a unitary grommet for enabling a headlight protecting screen to be securely and efficiently mounted therein and mounted to a headlight-opening-defining portion of a vehicle bumper, for protecting a vehicle headlight.

2. Description of the Prior Art

Devices in the prior art, known to the applicant, for mounting protective coverings in vehicles, include pivoted metal headlight screen mounting assemblies, and a complex molding strip for mounting a windshield pane.

Such devices are disclosed in U.S. Pat. No. 2,771,542 for "Headlamp and Door Assembly", U.S. Pat. No. 2,254,137 for "Automotive Protective Screen", U.S. Pat. No. 1,923,970 for "Automobile Headlight Protector", U.S. Pat. No. 1,187,968 for "Combined Headlight Guard and Dimmer", and U.S. Pat. No. 3,815,303 for "Profile Strip for the Mounting Support of Fixedly Installed Panes".

Such devices, however, are generally complex, expensive, and inefficient. Further, some of such devices are subject to tampering, removal, and damage, while others are generally difficult and expensive to install. Those mounting devices comprised of a metallic material are subject to damage, rust, and corrosion.

SUMMARY OF THE INVENTION

The present invention is directed generally to an article for mounting a headlight-protecting screen in a vehicle bumper, such that the screen extends in front of and protects the vehicle headlight from road debris and other potentially dangerous conditions.

Specifically, the present invention is directed to a unitary grommet, comprised of resiliently flexible material, for enabling secure mounting thereof in a headlight-opening-defining portion of the vehicle bumper, and for securely mounting therein a headlight-protecting cover or screen.

The headlight protective device comprises, in combination with the headlight protective screen or guard, a unitary, flexibly resilient, ring-like or annular grommet member, preferably made of a natural rubber or synthetic rubbery material. The unitary grommet is provided with a generally flat annular, wall member, the wall having an interior surface and an exterior surface[1] (when normally mounted to the vehicle bumper and the like), the wall member having integrally affixed thereto a first rim member extending radially inwardly from the outer periphery of the annular wall member and spaced from, and adjacent to, the interior surface thereof to define, with said wall member, an inwardly opening, annular, interior channel of substantial depth; the wall member also has a second, integrally formed, rim member extending from the inner periphery of the wall member and speced from, and adjacent to the exterior surface to define, with said wall member, a second outwardly-opening annular exterior channel which is axially offset from the said first inwardly-opening interior channel. Both the channels are thus formed with flexibly resilient wall and rim members.

[1] The terms "interior" and "exterior" are defined, for purpose of this specification and claims herein appended, in relation to their proximity to the vehicle body, the "interior" surface being closest to the vehicle body and the "exterior" surface being furthest from the vehicle body. These terms are used also, in this same sense, to locate other parts of the mounted grommet.

The headlight screen or cover is usually made of substantially rigid material, e.g. stainless steel. The outer peripheral edge of the screen is then mounted within the inwardly-facing interior channel and this assembly is next mounted to the usually circular vehicle headlight opening, the outwardly opening annular, exterior, channel being adapted to interfit along the peripheral edge of the vehicle headlight opening, in tongue and groove fashion.

The inwardly-opening channel, within which the headlight screen is mounted, lies behind the vehicle bumper, in normal mounting of the grommet, thereby preventing access to, and protecting, the screen.

Other features and advantages of the present invention will be apparent from the drawings and detailed description of the preferred embodiment herein.

BRIEF DESCRIPTION OF THE DRAWINGS

FIG. 1 is a front elevational view of a unitary grommet in a preferred embodiment of the invention;

FIG. 2 is an enlarged side elevational partly-fragmentary cross-sectional view of the unitary grommet with a wire-mesh screen mounted therein, mounted in a vehicle bumper headlight opening; and FIG. 3 is a front elevational partly-fragmentary view of the vehicle bumper, with the unitary grommet and wire-mesh screen mounted therein.

DETAILED DESCRIPTION OF THE PREFERRED EMBODIMENT

Referring to FIGS. 1-3, unitary grommet 10 of the present invention is adapted to securely mount therein a wire-mesh screen 12 for protecting a vehicle headlight from debris and other dangerous conditions, and is further adapted to enable grommet 10, with wire-mesh screen 12 mounted therein, to be securely mounted in a headlight-opening-defining portion A of a vehicle-bumper B. Bumper B may be mounted to the vehicle spaced forwardly of the vehicle body, with the headlight-opening in bumper B extending in front of the vehicle headlight.

The unitary grommet 10 is preferably made of a flexibly resilient material such as natural or synthetic rubber. The grommet 10 comprises, structurally, a generally flat annular wall member having opposed wall surfaces, which for convenience will be designated as having an interior surface 18, an opposed exterior surface 16, a radially outer portion 20 and a radially inner portion 22. The interior wall surface 18 is that surface which is closest to the vehicle body while the exterior surface 16 is the furthest from the vehicle body when the grommet 10 is properly mounted within the headlight opening.

Integrally formed with the wall member 14 is a first or interior rim member 28. Rim member 28 extends radially inwardly from the radially outer portion 20 of wall member 14 and is spaced from, and adjacent to interior wall surface 18 to define, with wall surface 18 an annular inwardly opening interior channel 30. Annular, interior, channel 30 has, of course, flexibly resilient side walls so that the peripheral edge portion 32 of the headlight screen 12 can be readily inserted within the channel 30. Channel 30 is of substantial depth, the depth of channel 30 being only slightly less than the width (measured radially) of the wall member 14 itself. The substantial depth of channel 30 provides a more secure mounting for the headlight screen.

A second rim member 24 is integrally formed with said wall member 14. Rim member 24 extends radically outwardly from the radially inner portion 22 of wall member 14 and is spaced from, and adjacent to exterior wall surface 16 to define, with wall surface 16, an outwardly opening annular, exterior channel 26. Exterior channel 26 has, of course, flexible side walls so that the grommet 10 can readily be mounted by interfit of channel 26 to the peripheral edge A of the vehicle light opening. The outwardly-opening exterior channel 26 is offset, in an axial direction, from inwardly opening, interior channel 30. (The axial direction is defined, for purposes of this specification and claims, as a direction taken along the central axis of the grommet 10).

The peripheral outer rim 32 of wire-mesh screen 12 enables the efficient and secure mounting of screen 12 in interior channel 30 of grommet 10, and further includes a generally convexly shaped central section 34, for protecting the vehicle headlight.

In use, as shown in FIG. 2, screen 12 may be mounted in grommet 10 by flexing resilient ring member 28 and inserting peripheral outer rim 32 of screen 12 in interior channel 30 of grommet 10. The substantial extent of interior rim 28 provides secure and efficient mounting of screen 12 in grommet 10.

Grommet 10 with screen 12 mounted therein may then be mounted in the headlight opening in bumper B, by inserting grommet 10 in the space between the vehicle body and bumper B such that rim member 24 extends towards the headlight opening in bumper B. Exterior rim member 24 of grommet 10 may then be flexed permitting channel 26 to interfit with the headlight-opening-defining portion of bumper B, providing secure and efficient mounting of grommet 10 in bumper B.

In such normally installed position, the peripheral radially outer rim 32 of screen 12 extends behind bumper B, preventing access thereto for tampering therewith, and thereby securely mounts screen 12 in bumper B to protect the vehicle headlight.

While grommet 10 has been described as preferably generally ring-shaped, and comprised of resiliently flexible material, the invention includes grommets of other shapes usable for mounting protective covers or screens in vehicle-headlight-protecting openings or the like. Further, screens or protective covers other than wire-mesh, and having shapes other than the shape described above, are included in the invention.

The unitary grommet, herein described, can be utilized, without the protective screen, as a trim member or molding for a light opening.

The present invention provides secure, efficient, and effective mounting of a headlight-protecting screen therein, and of the grommet to a vehicle bumper. These and other advantages will be appreciated by those skilled in the art, from the present specification.

While preferred embodiments of the present invention have been set forth in the above description for the purpose of explaining the invention, it is to be understood that variations and changes may be made in such embodiments which are nevertheless within the scope and spirit of the invention.

We claim:

1. A unitary grommet, generally annular-shaped, comprised of resilient material, adapted to enable secure mounting therein of a cover for protecting a vehicle headlight, which cover includes a peripheral generally annular flange portion, and further adapted to enable mounting thereof in a portion of a vehicle bumper spaced forwardly of a headlight in the front end of the vehicle body, which vehicle bumper portion defines an opening aligned with the headlight for enabling light from the headlight to project therethrough, comprising:
   (a) a first portion, extending in a first axial direction from the center of the grommet, adapted to receive the flange portion of the headlight protecting cover for securely mounting the headlight protecting cover therein; and
   (b) a second portion, extending in a second axial direction from the center of the grommet opposite from the first axial direction of the first portion, adapted to enable secure mounting of the grommet in the opening-defining portion of the vehicle bumper.

2. A unitary grommet as in claim 1, in which the first portion is further adapted to extend behind the vehicle bumper upon mounting the grommet in the vehicle bumper opening so as to securely mount the cover in the grommet behind the vehicle bumper.

3. A unitary grommet as in claim 1, in which the first portion is generally U-shaped in cross-section, defining a generally annular peripheral centrally-opening channel.

4. A unitary grommet as in claim 3, in which the radial length of the cover flange portion is substantially greater than the axial width thereof, and the radial depth of the grommet first portion channel is substantially greater than the axial width thereof.

5. A combination headlight cover and unitary mounting grommet, comprising:
   (a) a headlight cover, for protecting a vehicle headlight, which includes a peripheral generally annular flange portion; and
   (b) a unitary mounting grommet, generally annular-shaped, comprised of resilient material, in which the cover is mounted, adapted to enable mounting thereof in a portion of a vehicle bumper spaced forwardly of a headlight in the front end of the vehicle body, which vehicle bumper portion defines an opening aligned with the headlight for enabling light from the headlight to project therethrough, which unitary mounting grommet includes a first portion, extending in a first axial direction from the center thereof, in which the flange portion of the cover is mounted, and a second portion, extending in a second axial direction from the center thereof opposite from the first axial direction of the first portion, adapted to enable mounting of the grommet in the opening-defining portion of the vehicle bumper.

6. A combination as in claim 5, in which the first portion of the grommet is further adapted to extend behind the vehicle bumper upon mounting the grommet in the vehicle bumper opening so as to mount the cover in the grommet behind the vehicle bumper.

7. A combination as in claim 5, in which the first portion of the grommet is generally U-shaped in cross-section, defining a generally annular periphal centrally-opening channel.

8. A combination as in claim 7, in which the radial length of the cover flange portion is substantially greater than the axial width thereof, and the radial depth of the grommet first portion channel is substantially greater than the axial width thereof.

* * * * *